(12) United States Patent
Miki et al.

(10) Patent No.: US 8,346,441 B2
(45) Date of Patent: Jan. 1, 2013

(54) MOTOR VEHICLE WITH DYNAMIC BALANCING OCCUPANT RIDING PORTION

(75) Inventors: Nobuaki Miki, Tokyo (JP); Munehisa Horiguchi, Tokyo (JP); Katsunori Doi, Tokyo (JP)

(73) Assignee: KabushikiKaisha Equos Research, Tokyo (JP)

( * ) Notice: Subject to any disclaimer, the term of this patent is extended or adjusted under 35 U.S.C. 154(b) by 798 days.

(21) Appl. No.: 12/084,388

(22) PCT Filed: Nov. 24, 2006

(86) PCT No.: PCT/JP2006/323422
§ 371 (c)(1),
(2), (4) Date: Aug. 26, 2009

(87) PCT Pub. No.: WO2007/077690
PCT Pub. Date: Jul. 12, 2007

(65) Prior Publication Data
US 2010/0017069 A1 Jan. 21, 2010

(30) Foreign Application Priority Data

Dec. 28, 2005 (JP) ................................. 2005-378952
Dec. 28, 2005 (JP) ................................. 2005-378953

(51) Int. Cl.
*B60R 22/00* (2006.01)
*E05F 15/00* (2006.01)
*G05D 1/00* (2006.01)
*G05D 3/00* (2006.01)
*G06F 7/00* (2006.01)
*G06F 17/00* (2006.01)

(52) U.S. Cl. .............. 701/49; 701/36; 701/50; 180/218; 180/326; 180/328; 180/329; 180/330; 280/205; 280/208; 280/220; 280/229; 297/215.13; 297/313; 297/314

(58) Field of Classification Search .................... 701/36, 701/45, 48, 49, 50; 180/21, 218, 8.2, 907, 180/7.1, 326–330, 89.14; 280/5.28, 5.38, 280/205, 208, 209, 218, 220, 221, 229, 304.1; 297/195.1, 215.13–215.15, 208, 311–314, 297/330, 337

See application file for complete search history.

(56) References Cited

U.S. PATENT DOCUMENTS

| 2,572,910 A | 10/1951 | Brown |
| 4,869,054 A | 9/1989 | Hostetler et al. |
| 4,903,790 A * | 2/1990 | Horiike et al. ................ 180/219 |

(Continued)

FOREIGN PATENT DOCUMENTS

EP 1090568 4/2001

(Continued)

*Primary Examiner* — Thomas Tarcza
*Assistant Examiner* — Rami Khatib
(74) *Attorney, Agent, or Firm* — Bacon & Thomas, PLLC

(57) ABSTRACT

A motor vehicle has a body, a wheel rotatably supported and coaxially disposed on the body, and an occupant riding portion supported by the body. The motor vehicle is provided with a body attitude detector for detecting an attitude of the body and a body attitude controller for controlling the body attitude detected by the body attitude detector, wherein, in response to an inertial force or a centrifugal force generated by acceleration, deceleration or a turning motion of the motor vehicle, the occupant riding portion is moved so as to balance the inertial force or the centrifugal force. The motor vehicle further includes an occupant attitude controller for controlling an attitude of the occupant riding portion in accordance with a detection value detected by the body attitude detector.

12 Claims, 17 Drawing Sheets

U.S. PATENT DOCUMENTS

| | | | |
|---|---|---|---|
| 5,285,139 A * | 2/1994 | Ogasawara | 318/466 |
| 5,711,139 A | 1/1998 | Swanson | |
| 5,971,091 A * | 10/1999 | Kamen et al. | 180/218 |
| 5,975,225 A * | 11/1999 | Kamen et al. | 180/7.1 |
| 6,059,253 A * | 5/2000 | Koutsky et al. | 248/550 |
| 6,115,639 A * | 9/2000 | Takenaka | 700/85 |
| 7,004,271 B1 * | 2/2006 | Kamen et al. | 180/21 |
| 7,273,116 B2 * | 9/2007 | Kamen et al. | 180/21 |
| 8,011,459 B2 * | 9/2011 | Serai et al. | 180/8.2 |
| 2002/0121394 A1 * | 9/2002 | Kamen et al. | 180/41 |
| 2003/0098662 A1 * | 5/2003 | Stachowski et al. | 318/466 |
| 2003/0184071 A1 * | 10/2003 | Tokumaru et al. | 280/758 |
| 2003/0226698 A1 | 12/2003 | Kamen et al. | |
| 2004/0094936 A1 * | 5/2004 | Koerlin | 280/650 |
| 2005/0121238 A1 * | 6/2005 | Ishii | 180/65.1 |
| 2006/0086544 A1 * | 4/2006 | Kamen et al. | 180/21 |
| 2007/0052377 A1 | 3/2007 | Fuwa | |
| 2009/0256331 A1 | 10/2009 | Horiguchi et al. | |

FOREIGN PATENT DOCUMENTS

| | | |
|---|---|---|
| EP | 1298041 | 4/2003 |
| JP | 63-305082 | 12/1988 |
| JP | 04201793 | 7/1992 |
| JP | 2004074814 | 3/2004 |
| JP | 2004129435 | 4/2004 |
| JP | 2004276727 | 10/2004 |
| JP | 2005-075070 | 3/2005 |
| JP | 2005-145296 | 6/2005 |
| JP | 2005-289372 | 10/2005 |
| JP | 2006-001385 | 1/2006 |

* cited by examiner

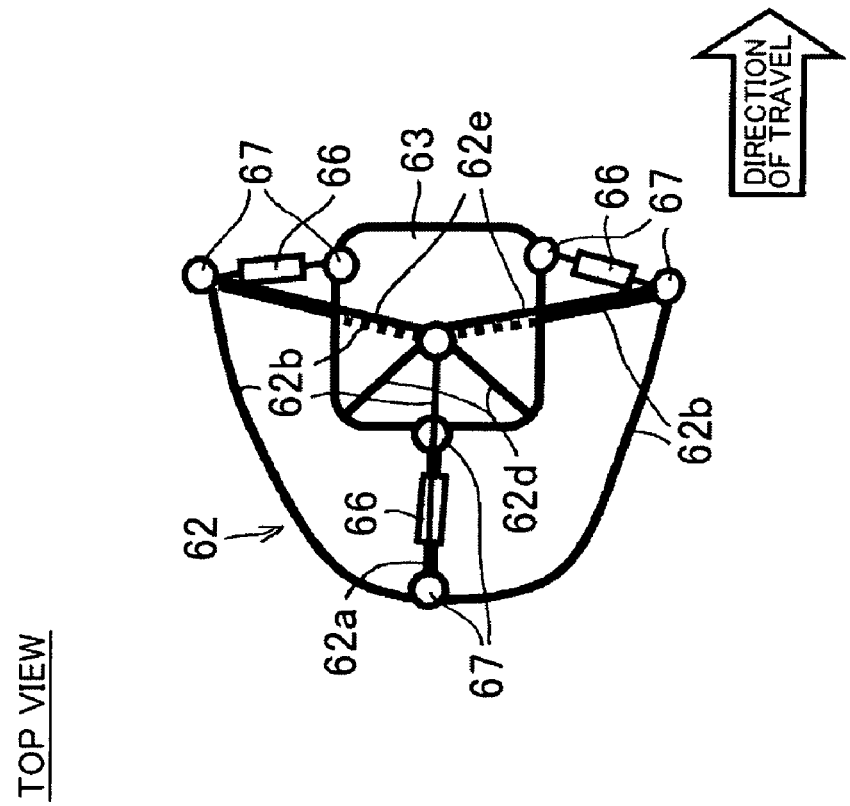
F I G. 10B
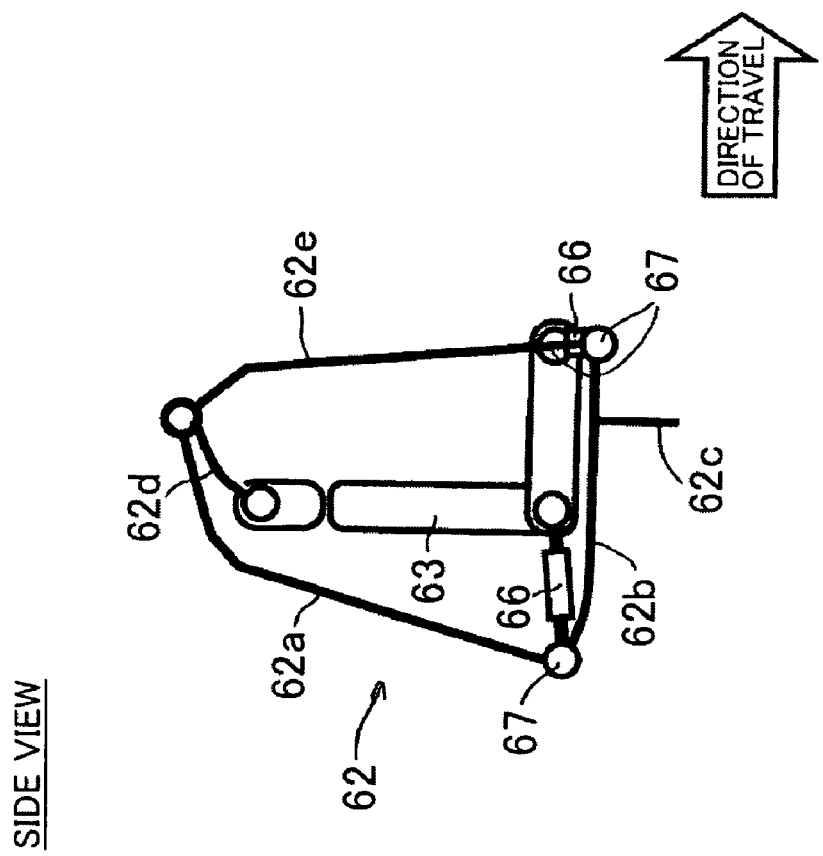
F I G. 10A

F I G . 15
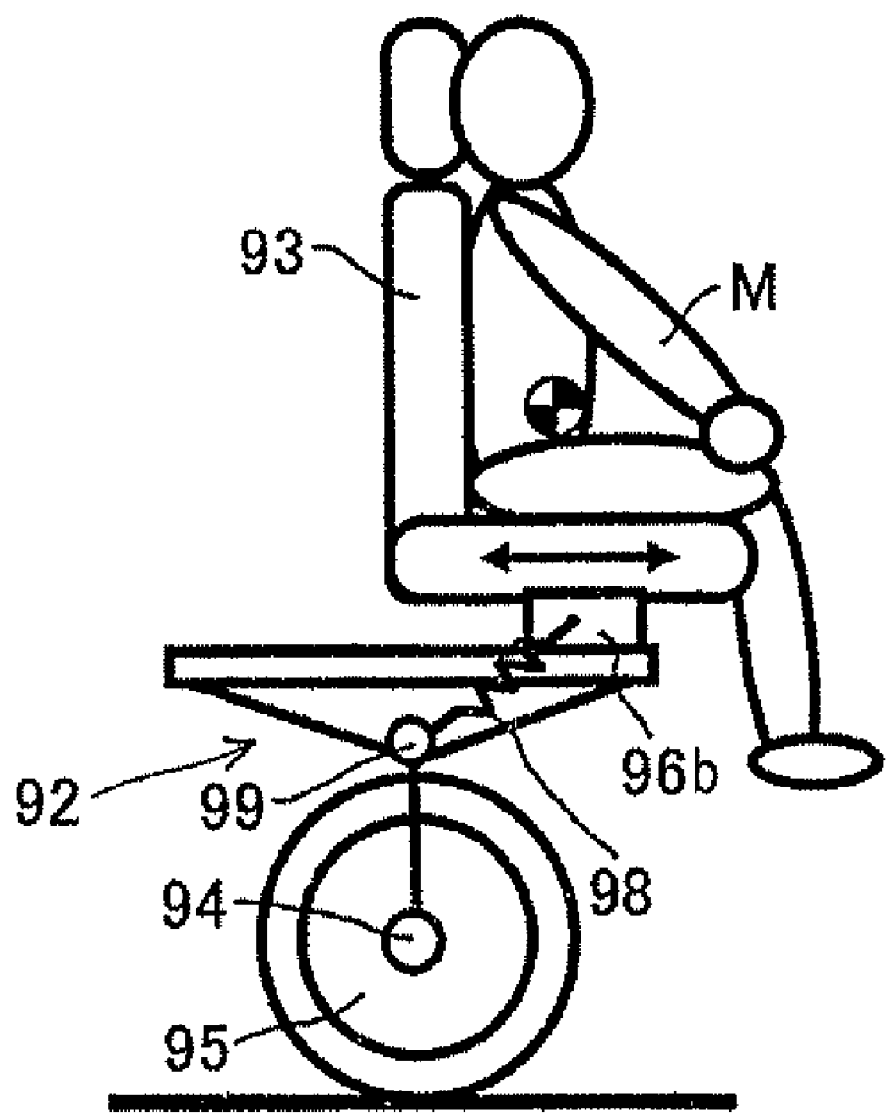

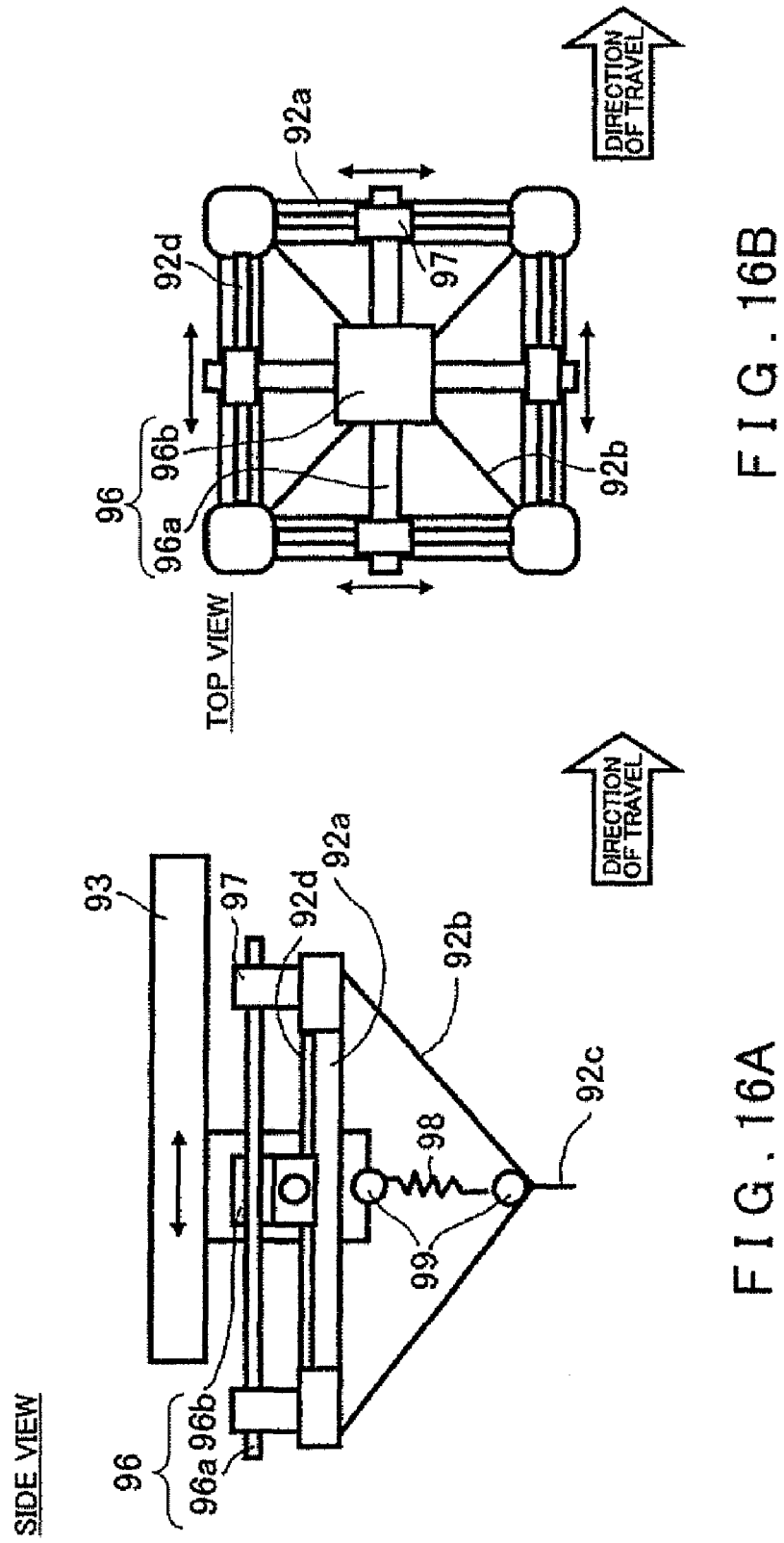

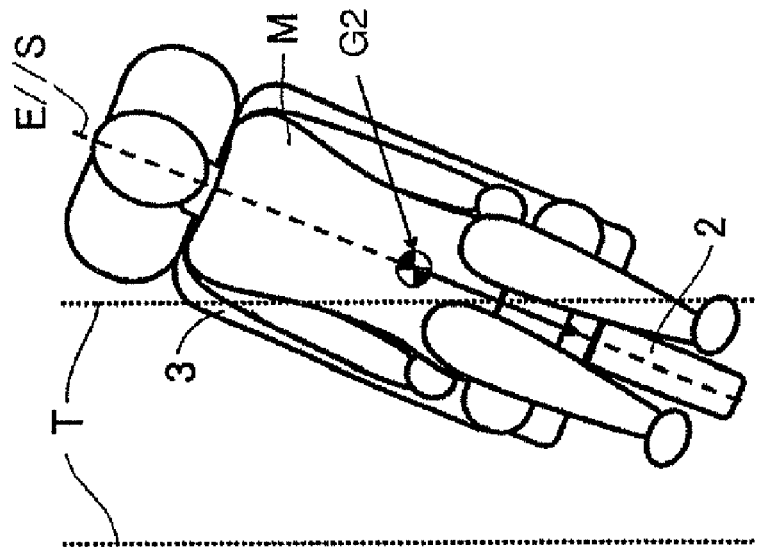
FOR OCCUPANT
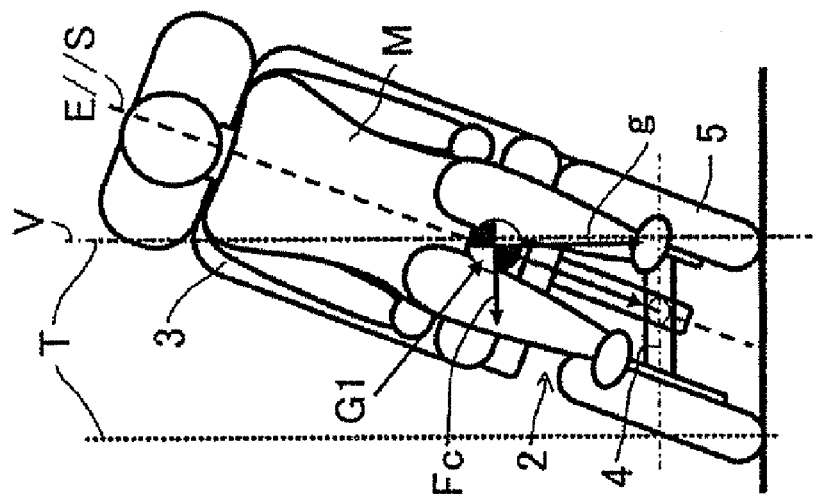
FIG. 18A (PRIOR ART)
FIG. 18B (PRIOR ART)

MOTOR VEHICLE WITH DYNAMIC BALANCING OCCUPANT RIDING PORTION

TECHNICAL FIELD

The present invention relates to a motor vehicle capable of comfortably holding an attitude of an occupant in a vehicle equipped with coaxial wheels and capable of freely changing the attitude of a rider.

BACKGROUND ART

A vehicle device has been disclosed (see Patent Document 1) with a structure in which a saddle is mounted on a carriage having two wheels arranged on the left and right, wherein the saddle has a movable permanent magnet to which the load of a rider is applied, and a stationary permanent magnet for levitation arranged mating with the movable permanent magnet in such a way that their counter-poles are positioned opposing and also fixed to the carriage, whereby the movable permanent magnet is supported in levitation from the stationary permanent magnet by a magnetic spring consisting of the movable permanent magnet and the stationary magnet for levitation.

FIGS. 17A and 17B are conceptual views showing conventional states of a motor vehicle 1 and an occupant M during acceleration. In the figures, reference numeral 1 denotes a motor vehicle, 2 denotes a body, 3 denotes a seat as an example of loading means, 4 denotes an axle, 5 denotes a wheel, G1 denotes an overall center of gravity, g denotes gravity, Fi denotes an inertial force, Ff denotes a forward force, V denotes a vertical axis, E denotes an equilibrium axis, B denotes a body axis, and P denotes a ground-contacting point.

In FIG. 17A, the motor vehicle 1 includes the body 2 connected with the axle 4 and the wheel 5, and provided with the seat 3. When the motor vehicle 1 accelerates, the inertial force Fi acts on the body 2 and the occupant M, and further acceleration results in the body 2 and the occupant M falling backward due to the influence of the inertial force Fi. Hence, the overall center of gravity G1 must be disposed on the equilibrium axis E to prevent such falling over.

FIGS. 18A and 18B are views showing conventional states of the motor vehicle 1 and the occupant M during turning. In the figures, reference numeral 1 denotes the motor vehicle, 2 denotes the body, 3 denotes the seat as an example of loading means, 4 denotes the axle, 5 denotes the wheel, G1 denotes the overall center of gravity, G2 denotes the occupant's center of gravity, g denotes gravity, Fc denotes a centrifugal force, V denotes the vertical axis, E denotes the equilibrium axis, B denotes the body axis, S denotes a riding axis, and T denotes a tread.

In FIG. 18A, the motor vehicle 1 includes the body 2 connected with the axle 4 and the wheel 5, and provided with the seat 3. When the motor vehicle 1 turns, the centrifugal force Fc acts on the body 2 and the occupant M, and further acceleration results in the body 2 and the occupant M falling to the side due to the influence of the centrifugal force Fc. Hence, the body 2 is tilted significantly more inward than the vertical axis V to arrange a dotted line E//S inside the wheel tread on a point that intersects the ground and to arrange the overall center of gravity G1 on the equilibrium axis E, in order to prevent falling and maintain balance.

Patent Document 1: Japanese Patent Application Publication No. JP-A-2005-145296

DISCLOSURE OF THE INVENTION

Problem to be Solved by the Invention

However, as FIG. 17B shows, maintaining balance by tilting the body 2 significantly more forward than the equilibrium axis E causes the forward force Ff to act on the occupant. In such case, the occupant experiences the forward force Ff regardless of acceleration. This experience of the forward force Ff feels unnatural to the occupant and is uncomfortable.

The state of the occupant M during turning is also illustrated in FIG. 18B. The occupant's center of gravity G2 causes the body 2 to tilt significantly more inward than the vertical axis V. This in turn positions the occupant's center of gravity G2 outside the tread T, and may result in contact with another object. The occupant's field of vision is tilted and the occupant's sense of turning is also dulled, which may affect speed as well as steering and other operations.

The present invention resolves the above problems, and it is an object of the present invention to provide a motor vehicle that moves an occupant riding portion so as to balance an inertial force or a centrifugal force acting on the occupant riding portion, and that controls an attitude of the occupant riding portion at will.

Means for Solving the Problem

Thus, the present invention is a motor vehicle having a body, a wheel rotatably supported and coaxially disposed on the body, and an occupant riding portion supported by the body and mounted with an occupant, the motor vehicle characterized by including: body attitude detection means for detecting an attitude of the body; and body attitude control means for controlling the body attitude detected by the body attitude detection means. In response to an inertial force or a centrifugal force generated by acceleration, deceleration, or a turning motion of the motor vehicle, the occupant riding portion is moved so as to balance the inertial force or the centrifugal force.

The motor vehicle is also characterized in that the body includes an occupant riding support portion from which the occupant riding portion is suspended and supported.

The motor vehicle is also characterized in that the body and the occupant riding portion are connected by damping means below the occupant riding portion and a center of gravity of the occupant.

The motor vehicle is also characterized in that the body includes the occupant riding support portion that supports the occupant riding portion, and a spherical body is disposed between the occupant riding portion and the occupant riding support portion, which are further connected by a spring.

The motor vehicle is also characterized in that the occupant riding support portion includes a stopper portion on a peripheral edge thereof.

The motor vehicle is also characterized in that the occupant riding support portion holds a fluid.

Furthermore, the present invention is a motor vehicle having a body, a wheel rotatably supported and coaxially disposed on the body, and an occupant riding portion supported by the body and mounted with an occupant, the motor vehicle characterized by including: body attitude detection means for detecting an attitude of the body; body attitude control means for controlling the body attitude based on a detection value detected by the body attitude detection means; and occupant attitude control means that controls an attitude of the occupant in accordance with the detection value detected by the body attitude detection means.

The motor vehicle is also characterized in that the motor vehicle further includes occupant attitude detection means for detecting an attitude of the occupant riding portion, wherein the occupant attitude control means controls the attitude of the occupant riding portion in accordance with the detection value detected by the body attitude detection means and the occupant attitude detected by the occupant attitude detection means.

The motor vehicle is also characterized in that the body attitude detection means includes acceleration detection means for detecting an acceleration of the body, and the occupant attitude control means controls the attitude of the occupant riding portion in accordance with the acceleration detected by the acceleration detection means.

The motor vehicle is also characterized in that the motor vehicle further includes occupant attitude detection means for detecting an attitude of the occupant riding portion, wherein the occupant attitude control means controls the attitude of the occupant riding portion in accordance with an acceleration and a deceleration detected by the acceleration detection means and the occupant attitude detected by the occupant attitude detection means.

Effects of the Invention

The present invention is a motor vehicle having a body, a wheel rotatably supported and coaxially disposed on the body, and an occupant riding portion supported by the body and mounted with an occupant, the motor vehicle characterized by including: body attitude detection means for detecting an attitude of the body; and body attitude control means for controlling the body attitude detected by the body attitude detection means. In response to an inertial force or a centrifugal force generated by acceleration, deceleration or a turning motion of the motor vehicle, the occupant riding portion is moved so as to balance the inertial force or the centrifugal force. Therefore, the occupant feels the same force while balanced as when stationary, making it possible to reduce the load on the occupant during accelerating, decelerating, and turning.

The body includes an occupant riding support portion from which the occupant riding portion is suspended and supported. Therefore, the body automatically tilts so as to balance the inertial force or the centrifugal force. As a consequence, extra energy is not used.

The body and the occupant riding portion are connected by damping means below the occupant riding portion and a center of gravity of the occupant. Therefore, the occupant feels the same force while balanced as when stationary. Adjustment of the character frequency as determined based on the occupant's weight, inertial moment, height of center of gravity, damping capacity of the damping means, and the like makes it possible to reduce the load on the occupant during accelerating, decelerating, and turning. Also, the damping means is provided between the body and the occupant riding portion, and enables gentle changes in the attitude of the occupant with respect to rapid changes of the body axis.

The body includes the occupant riding support portion that supports the occupant riding portion, and a spherical body is disposed between the occupant riding portion and the occupant riding support portion, which are further connected by a spring. Therefore, the occupant feels the same force while balanced as when stationary. Adjustment of the character frequency as determined based on the occupant's weight, inertial moment, height of center of gravity, and bottom surface curvature radius makes it possible to reduce the load on the occupant with respect to rapid changes in the inertial force or the centrifugal force and can reduce the friction between the two surfaces for connection with the body. In addition, the body automatically tilts so as to balance the inertial force or the centrifugal force. As a consequence, extra energy is not used.

The occupant riding support portion includes a stopper portion on a peripheral edge thereof, which ensures that the ball does not escape from a space between the upper end surface of the body and the bottom surface of the seat.

The occupant riding support portion holds a fluid, which achieves a damping capacity and enables adjustment of the character frequency with a damping coefficient used as a parameter.

The present invention is also a motor vehicle having a body, a wheel rotatably supported and coaxially disposed on the body, and an occupant riding portion supported by the body and mounted with an occupant, the motor vehicle characterized by including: body attitude detection means for detecting an attitude of the body; body attitude control means for controlling the body attitude based on a detection value detected by the body attitude detection means; and occupant attitude control means that controls an attitude of the occupant riding portion in accordance with the detection value detected by the body attitude detection means. Therefore, by changing the attitude of the occupant riding portion, the acceleration experienced by the occupant can be arbitrarily set when the acceleration of the motor vehicle changes. The occupant can thus be moved smoothly while also allowing the attitude of the occupant to be freely set. The occupant attitude control means can also be connected with existing body attitude control means, which offers an advantage in terms of cost.

The motor vehicle further includes occupant attitude detection means for detecting an attitude of the occupant riding portion, wherein the occupant attitude control means controls the attitude of the occupant riding portion in accordance with the detection value detected by the body attitude detection means and the occupant attitude detected by the occupant attitude detection means. Therefore, a superior and more precise control can be achieved.

The body attitude detection means includes acceleration detection means for detecting an acceleration and a deceleration of the body, and the occupant attitude control means controls the attitude of the occupant riding portion in accordance with the acceleration and the deceleration detected by the acceleration detection means. Therefore, control can be achieved with a simple structure that uses only an accelerometer.

The motor vehicle further includes occupant attitude detection means for detecting an attitude of the occupant riding portion, wherein the occupant attitude control means controls the attitude of the occupant riding portion in accordance with an acceleration and a deceleration detected by the acceleration detection means and the occupant attitude detected by the occupant attitude detection means. Therefore, a superior and more precise control can be achieved.

BRIEF DESCRIPTION OF THE DRAWINGS

FIG. 10 shows views of the first example of the second embodiment.

FIG. 15 is a view showing a fourth example of the second embodiment.

FIG. 16 shows views of the fourth example of the second embodiment.

FIG. 18 shows views of a related art.

BEST MODES FOR CARRYING OUT THE INVENTION

Figure 1:
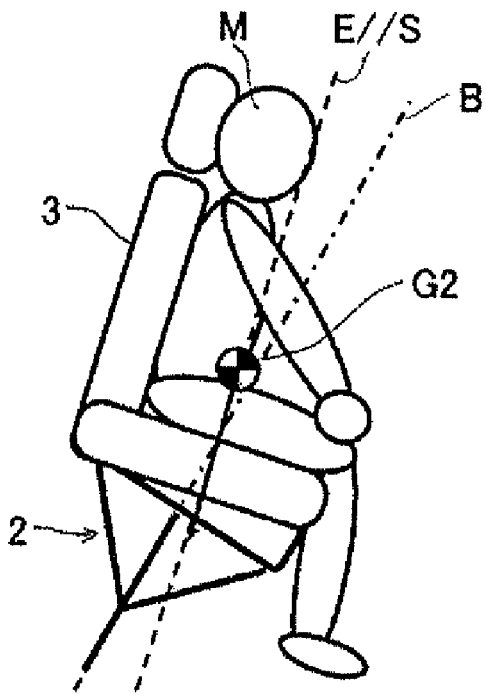
FIG. 1 is a conceptual view of a first embodiment.
Figure 17B:
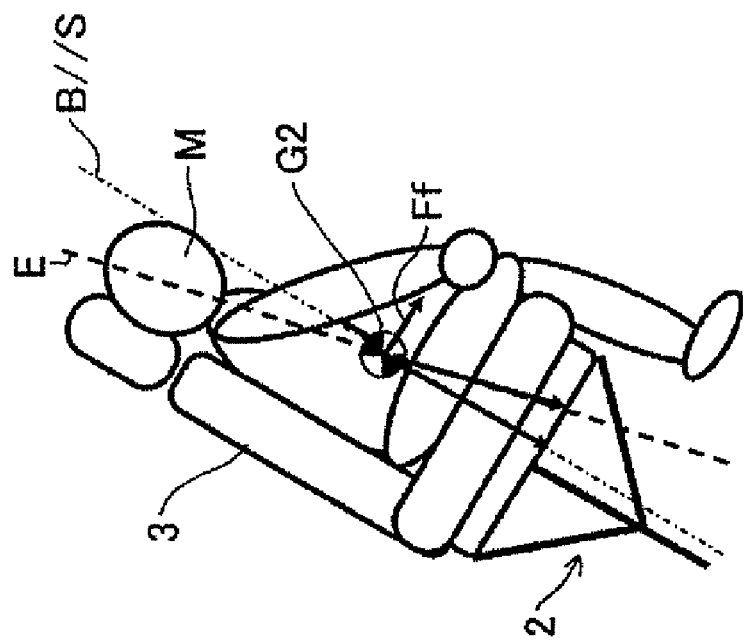
FIG. 17 shows view of a related art.
Figure 17A:
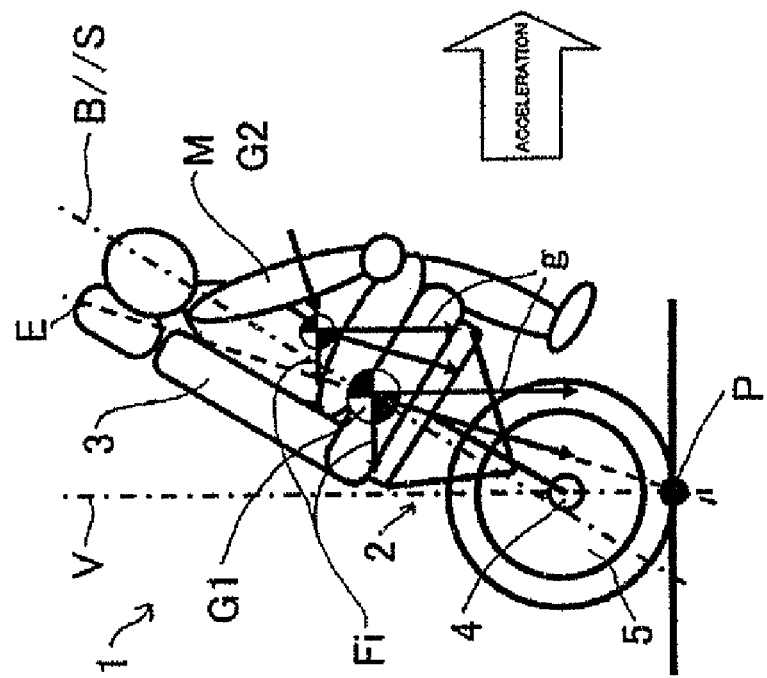

Embodiments serving as examples of the present invention will be described below with reference to the accompanying drawings. FIG. 1 is a conceptual view of a first embodiment. Reference numerals in the figure are the same as those used in FIGS. 17 and 18 for related art.

Figure 7:
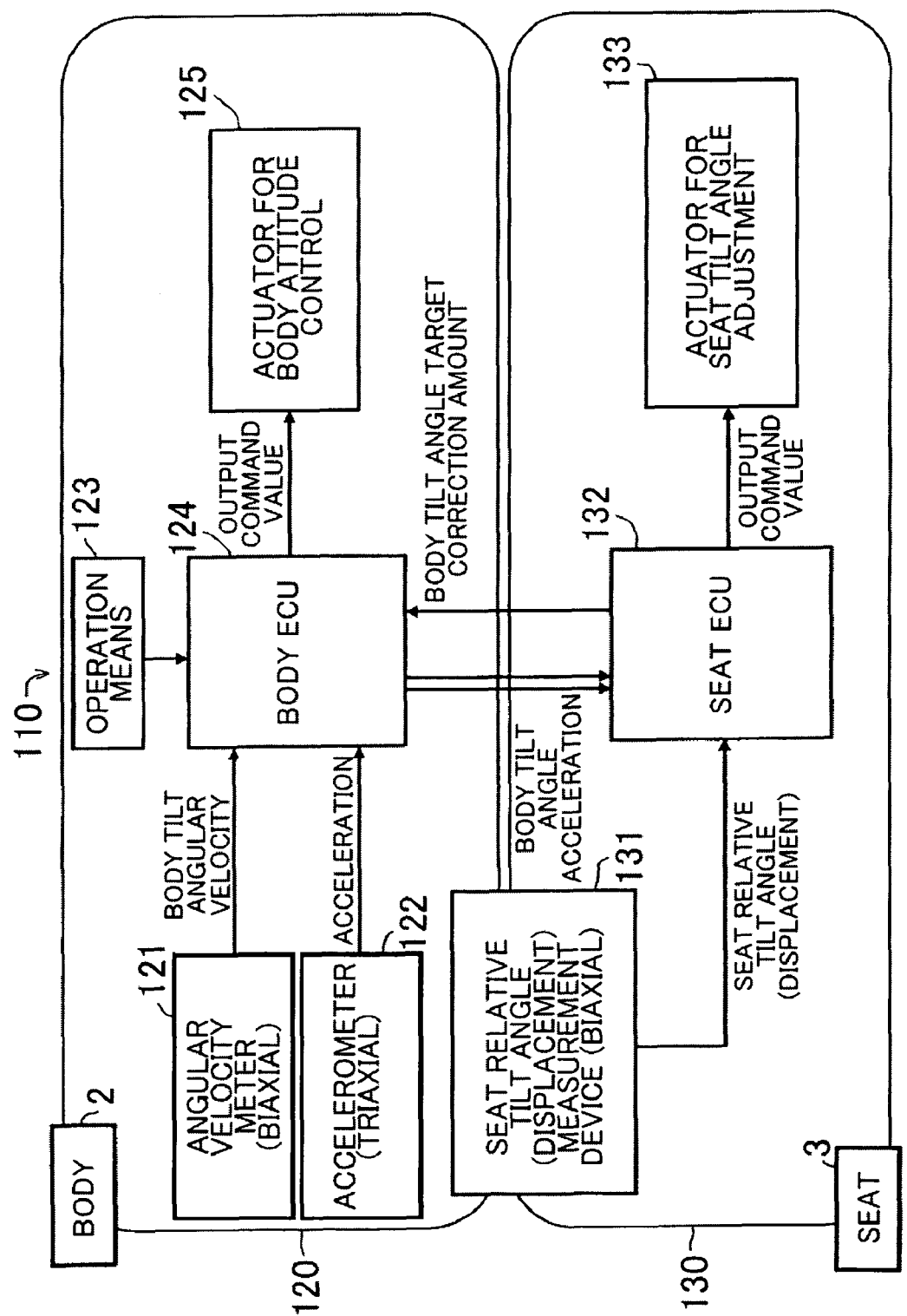
FIG. 7 is a view showing a control means structure of the second embodiment.

In this case, a motor vehicle 1 of the present embodiment is controlled so as to be capable of travel by an angular velocity meter 121 and an accelerometer 122 (described later) which serve as examples of body attitude detection means that detects an attitude of the body, and body attitude control means 120 that controls the body attitude detected by the angular velocity meter 121 and the accelerometer 122 (see FIG. 7). A seat 3 is also structured independent of the body 2 and tilted toward the equilibrium axis E so as to balance an inertial force or a centrifugal force acting on the seat 3.

By using such a structure, the occupant M feels the same force while balanced as when stationary, making it possible to reduce the load on the occupant during accelerating, decelerating, and turning.

Figure 2:
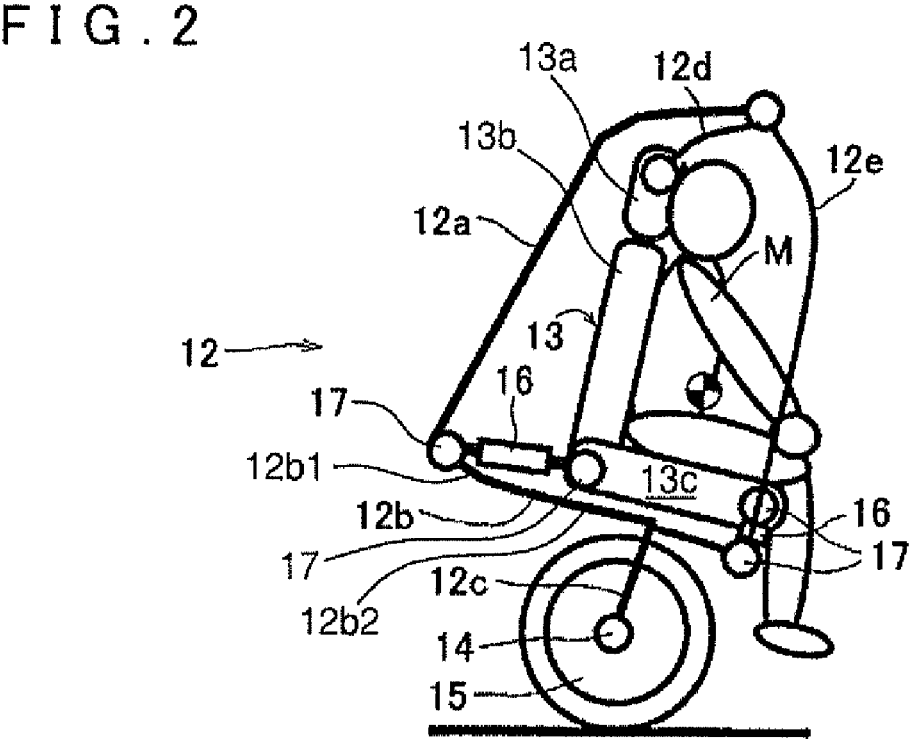
FIG. 2 is a view showing a first example of the first embodiment.
Figure 3:
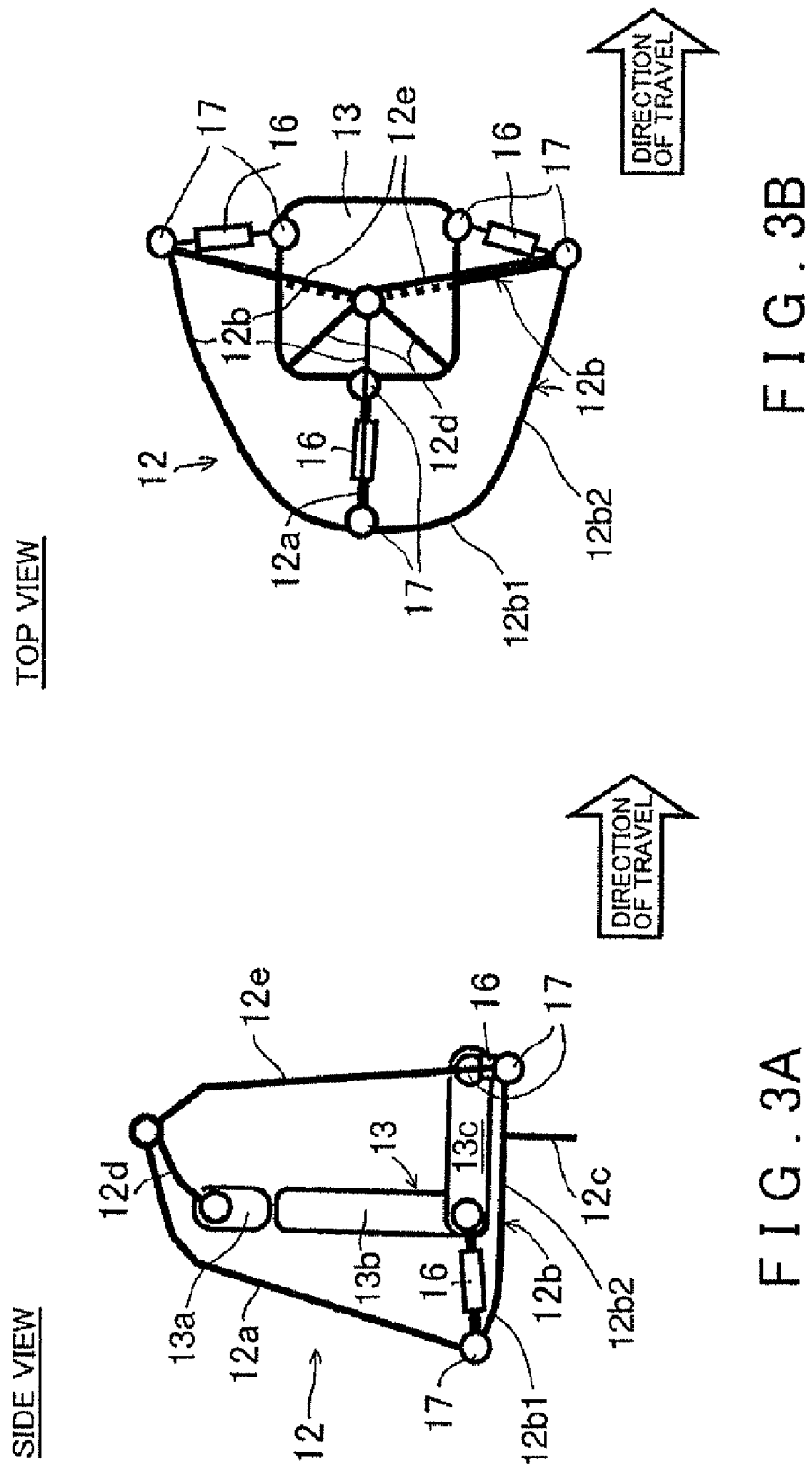
FIG. 3 shows views of the first example of the first embodiment.

FIGS. 2 and 3 are views showing a first example of the first embodiment. FIGS. 2 and 3 illustrate an example in which the seat rotational center is set above the seat and the occupant's center of gravity, and a damper is employed for the suspended seat. FIG. 2 is a schematic view showing the occupant seated. FIG. 3A is an enlarged view of an occupant riding portion, and FIG. 3B is a plane view of FIG. 3A.

In the figures, reference numeral 1 denotes the motor vehicle, 12 denotes a body, 12a denotes an upper portion, 12b denotes an intermediate portion, 12c denotes a lower portion, 12d denotes a first suspended portion, 12e denotes a second suspended portion, 13 denotes a seat as an example of the occupant riding portion, 14 denotes an axle, 15 denotes a wheel, 16 denotes a damper as an example of damping means, and 17 denotes a joint.

The body 12 includes the upper portion 12a, the intermediate portion 12b, the lower portion 12c, the first suspended portion 12d, and the second suspended portion 12e.

The upper portion 12a, which serves as an example of an occupant riding support portion, is provided extending from above the seat 13 toward the rear and curved so as to circumvent a backrest 13b of the seat 13. An upper end of the upper portion 12a is also connected with the first suspended portion 12d and the second suspended portion 12e via the joint 17. A lower end of the upper portion 12a is connected with the intermediate portion 12b and the damper 16 via the joint 17 at the rear of the seat 13. The upper end, which is a connection point between the first suspended portion 12d and the second suspended portion 12e, is the rotational center of the seat 13.

The intermediate portion 12b includes a curved portion 12b1 and a radial portion 12b2. The curved portion 12b1 has a shape that curves and extends from a side portion through the rear toward another side portion so as to circumvent a seat surface 130 in a region slightly below the seat 13. The radial portion 12b2 links an upper end of the lower portion 12c with the curved portion 12b1. The radial portion 12b1 of the present example is structured such that one leg extends from the upper end of the lower portion 12c toward an intersection point of the upper portion 12a and the curved portion 12b1, and the remaining two legs extend from the upper end of the lower portion 12c toward an end portion of the curved portion 12b1. The respective legs are joined via a joint 17. The intermediate portion 12b and the seat 13 are connected via the damper 16 and the joint 17. In the present example, one leg is connected between the seat surface 13c and an intersection point of the upper portion 12a and the curved portion 12b1, while the remaining two legs connect end portions of the curved portion 12b1 with the seat surface 13c on the forward left and right sides.

The upper end of the lower portion 12c is positioned at the center of the radial portion 12b2 of the intermediate portion 12b, while a lower end supports the axle 14. The first suspended portion 12d is connected with the upper end of the upper portion 12a and a headrest 13a of the seat 13 via a joint, whereby the seat 13 hangs from the upper end of the upper portion 13a. The second suspended portion 12e is connected with the upper end of the upper portion 12a and an end portion of the curved portion 12b1.

By using such a structure, the occupant feels the same force while balanced as when stationary. Adjustment of the character frequency as determined based on the occupant's weight, inertial moment, height of center of gravity, damping capacity of the damper, and the like makes it possible to reduce the load on the occupant during accelerating, decelerating, and turning. Also, the damper is provided between the body and the seat, and enables gentle changes in the attitude of the occupant with respect to rapid changes of the body axis.

Figure 4:
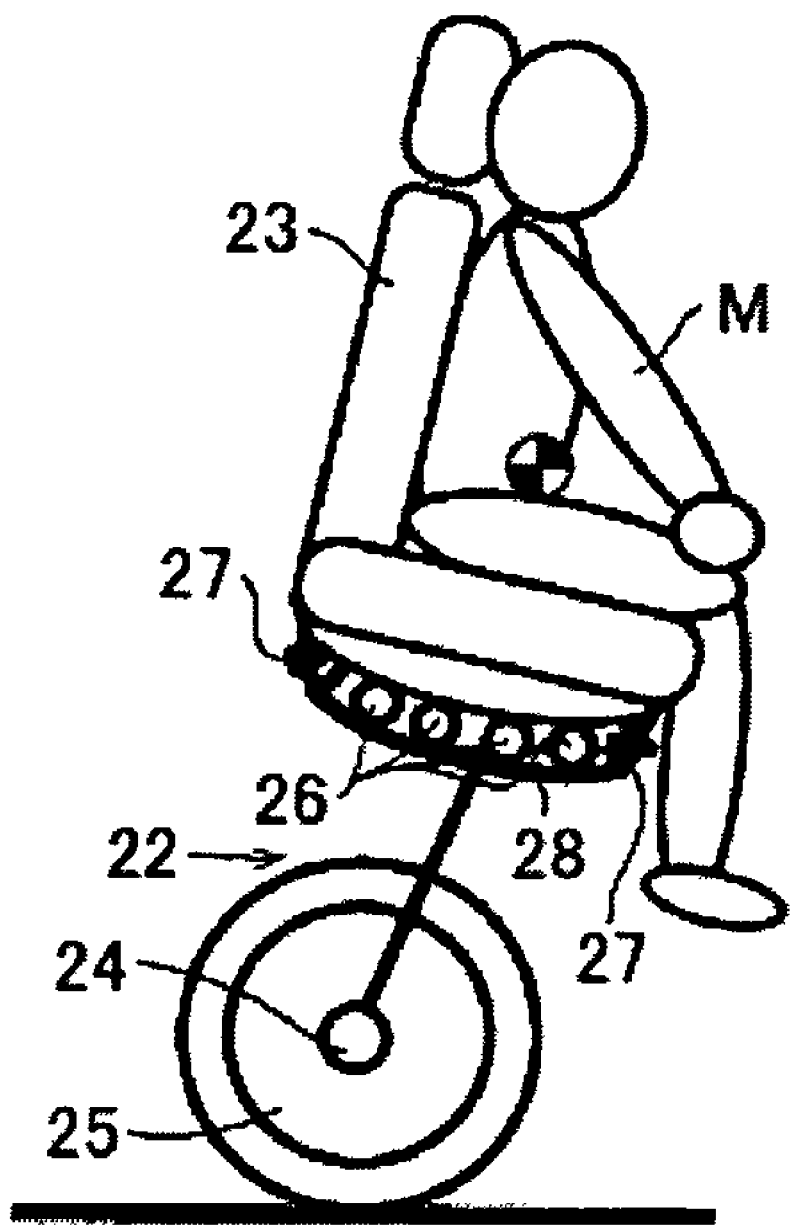
FIG. 4 is a view showing a second example of the first embodiment.
Figure 5:
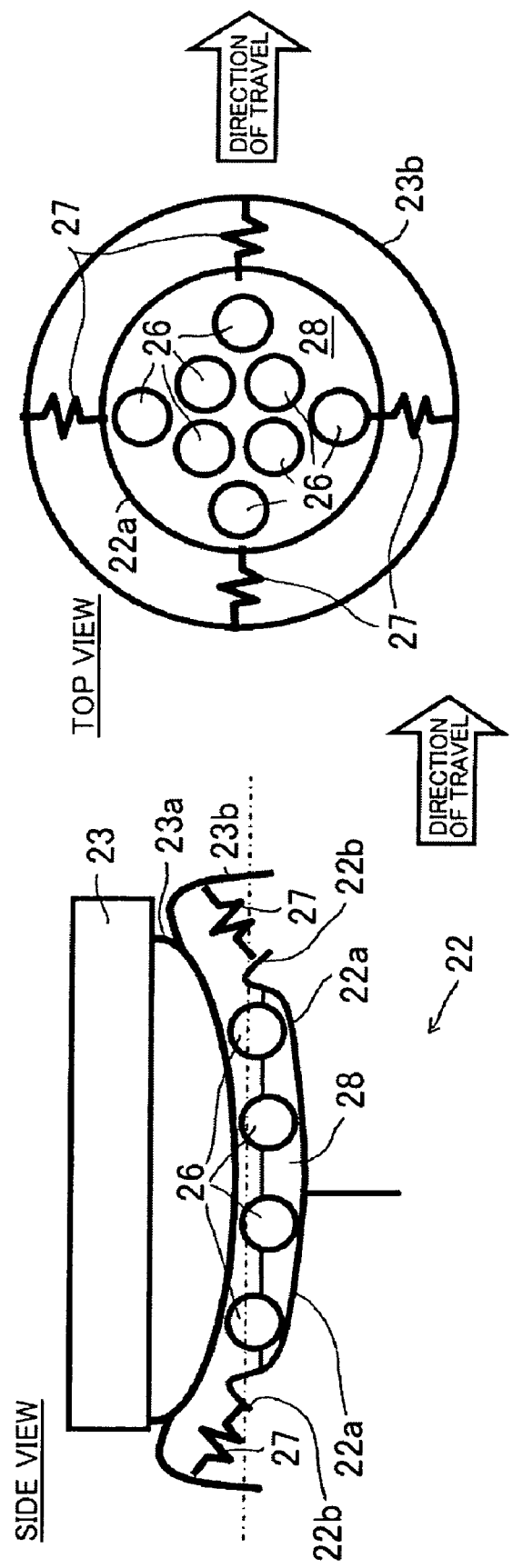
FIG. 5 shows views of the second example of the first embodiment.

A second example of the first embodiment will be described next. FIGS. 4 and 5 illustrate an example that employs a spherical surface and balls. FIG. 4 is a schematic view showing the occupant seated. FIG. 5A is an enlarged view of a seat driving portion, and FIG. 5B is a plane view of FIG. 5A.

In the figures, reference numeral 1 denotes the motor vehicle, 22 denotes a body, 22a denotes an upper end surface, 22b denotes a stopper portion, 23 denotes a seat as an example of the occupant riding portion, 23a denotes a bottom surface, 23b denotes a spring attachment portion, 24 denotes an axle, 25 denotes a wheel, 26 denotes a ball, 27 denotes a spring, and 28 denotes a fluid.

The body 22 includes the spherical upper end surface 22a, which serves as an example of the occupant riding support portion on an upper portion thereof, and has the stopper portion 22b on a peripheral rim of an upper end surface thereof. The body 22 is also connected with the seat 23 by a spring 27. The seat 23 includes the spherical bottom surface 23a. The balls 26 are disposed between the upper end surface 22a of the body 22 and the bottom surface 23a of the seat 23.

The upper end surface 22a peripheral edge of the body 22 is provided with the stopper portion 22b, and the spring 27 is provided in a radial direction between the stopper portion 22b and the spring attachment portion 23b of the seat 23. In addition, the upper end surface 22a on the spherical surface of the body 22 holds the fluid 28.

By using such a structure, the occupant feels the same force while balanced as when stationary. Adjustment of the character frequency as determined based on the occupant's weight, inertial moment, height of center of gravity, bottom surface curvature radius, and fluid viscosity makes it possible to reduce the load on the occupant during accelerating, decelerating, and turning. Furthermore, the upper end surface 22a of the body 22 is provided with the stopper portion 22b, which ensures that the balls 26 do not escape from a space between the upper end surface 22a of the body 22 and the bottom surface 23a of the seat 23. Also, the springs 27 are disposed in the radial direction between the stopper portion 22b and the spring attachment portion 23b of the seat 23, thereby connecting the body 22 and the seat 23. The balls 26 are disposed between the upper end surface 22a of the body 22 and the bottom surface 23a of the seat 23, and can reduce the friction between the two surfaces. Holding the fluid 28 ensures a damping capacity. Moreover, smooth changes in attitude are achieved by using fluid viscous friction that has a continuous property with respect to a relative speed, rather than static friction or dynamic friction which have discontinuous properties with respect to a relative speed.

Next as a second embodiment, a case that employs occupant attitude control means will be described.

Figure 6:
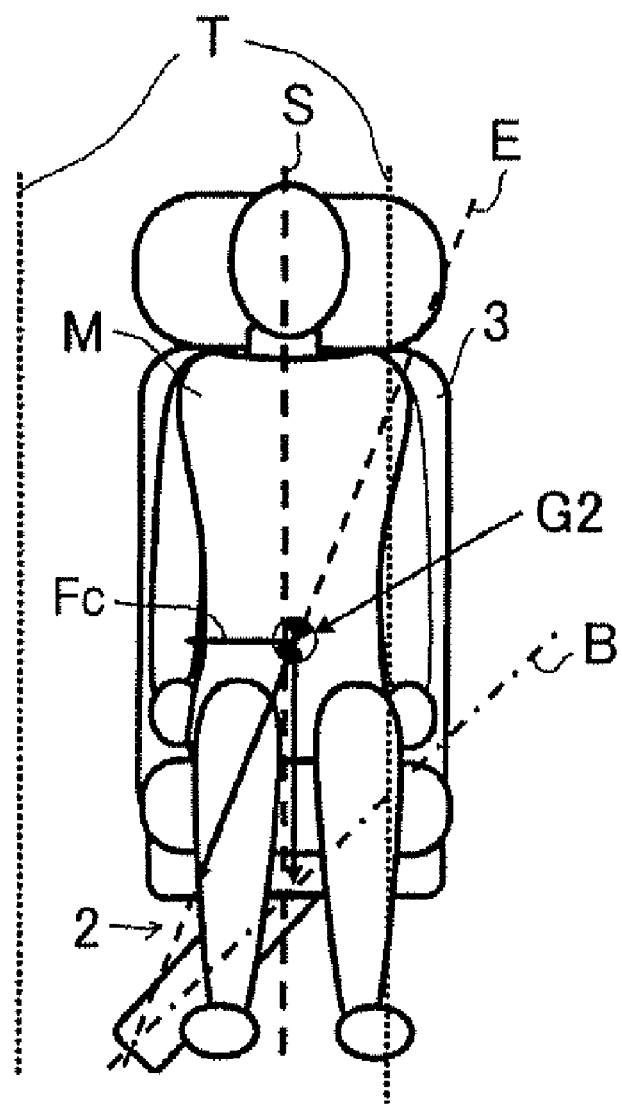
FIG. 6 is a conceptual view of a second embodiment.

FIG. 6 is a conceptual view of the second embodiment. The post-control occupant state during acceleration according to the second embodiment is similar to that in FIG. 1. FIG. 6 is a view showing a post-control occupant state during turning according to the second embodiment. Reference numerals in the figure are the same as those used in FIGS. 17 and 18 for related art.

The post-control state of the occupant M during acceleration is similar to that in FIG. 1, and the seat is tilted backward so that the riding axis S has the same inclination angle as the equilibrium axis E.

Controlling in such a manner eliminates the application of inertial force on the occupant M, so that the occupant M feels the same as in a stationary state. Also, controlling the seat 3 so as to tilt further rearward allows the occupant M to feel a rearward force, giving the sensation of acceleration. In other words, by changing the attitude of the seat 3 of the occupant M, the acceleration experienced by the occupant M can be arbitrarily set when the acceleration of the motor vehicle 1 changes. The occupant M can thus be moved smoothly while also allowing the attitude of the occupant M to be freely set.

FIG. 6 is a view showing a post-control occupant M state during turning. The seat 3 is rotated to the side and the body axis B is controlled so that the attitude of the occupant M is vertical in a front view.

By controlling in such a manner, turning is possible in a state where the occupant M is constantly upright, and the occupant M does not protrude outside of the tread T. Furthermore, turning can also be achieved that imparts a sense of a certain degree of centrifugal force, so that the occupant realizes that turning is occurring. In other words, by changing the attitude of the seat 3 of the occupant M, the occupant M can be moved smoothly with respect to changes in the turning radius and speed of the motor vehicle 1 while also allowing the attitude of the occupant M to be freely set.

Next, an explanation will be given of a control means structure of the motor vehicle described above. FIG. 7 is a view showing a control means structure of the second embodiment. In the figure, reference 110 denotes a motor vehicle control system; 120 denotes body attitude control means; 121 denotes an angular velocity meter serving as an example of body attitude detection means; 122 denotes an accelerometer serving as an example of body attitude detection means; 123 denotes operation means; 124 denotes a body ECU; 125 denotes an actuator for body attitude control; 130 denotes seat attitude control means serving as an example of occupant attitude control means; 131 denotes a seat relative tilt angle measurement device; 132 denotes a seat ECU; and 133 denotes an actuator for seat tilt angle adjustment.

The motor vehicle 1 of the present embodiment is controlled so as to be capable of travel by the angular velocity meter 121 and the accelerometer 122, which serve as examples of body attitude detection means that detect an attitude of the body, and the body attitude control means 120 that control the body attitude detected by the angular velocity meter 121 and the accelerometer 122. Also, the seat attitude control means 130 serving as an example of occupant attitude control means control the attitude of the seat 3, which serves as an example of the occupant riding portion, in accordance with the following: a tilt angle detected by the seat relative tilt angle measurement device 131 serving as an example of occupant attitude detection means; a body attitude detected by the body attitude detection means 120; an acceleration detected by the accelerometer 120 in particular; and operation of the operation means 123, which may be a joystick or the like.

The body control means 120 controls the body 2 by the body ECU 124 computing the body tilt angular velocity detected by the biaxial angular velocity meter 121 and the acceleration detected by the triaxial accelerometer 122, or by computing operation information from the operation means 123, which is a joystick or the like, and then outputting a command value to the actuator 125 for body attitude control. In addition, the body attitude control means 120 can execute an attitude control of the body that considers the relative tilt angle of the seat 3 by linking with the seat attitude control means 130 to output the body tilt angle and the acceleration from the body ECU 124 to the seat ECU 132, and outputting a body tilt angle/position target correction amount from the seat control means 130 to the body ECU 124.

The seat attitude control means 130 is capable of linking with the existing body attitude control means 120. The seat ECU 132 computes a seat tilt angle relative to the body that is detected by the biaxial seat relative tilt angel measurement device 131, which serves as an example of occupant attitude detection means, as well as the body tilt angle and the acceleration from the body ECU 124 of the body attitude control means 120. A body tilt angle target correction amount is output to the body ECU 124 and a command value is output to the actuator 133 for seat tilt angle adjustment. Thus, in this manner the body attitude control means 130 controls the seat tilt angle. Note that input to the body ECU 124 may independently use the angular velocity meter 121, the accelerometer 122, and the operation means 123, or use various combinations thereof.

Figure 8:
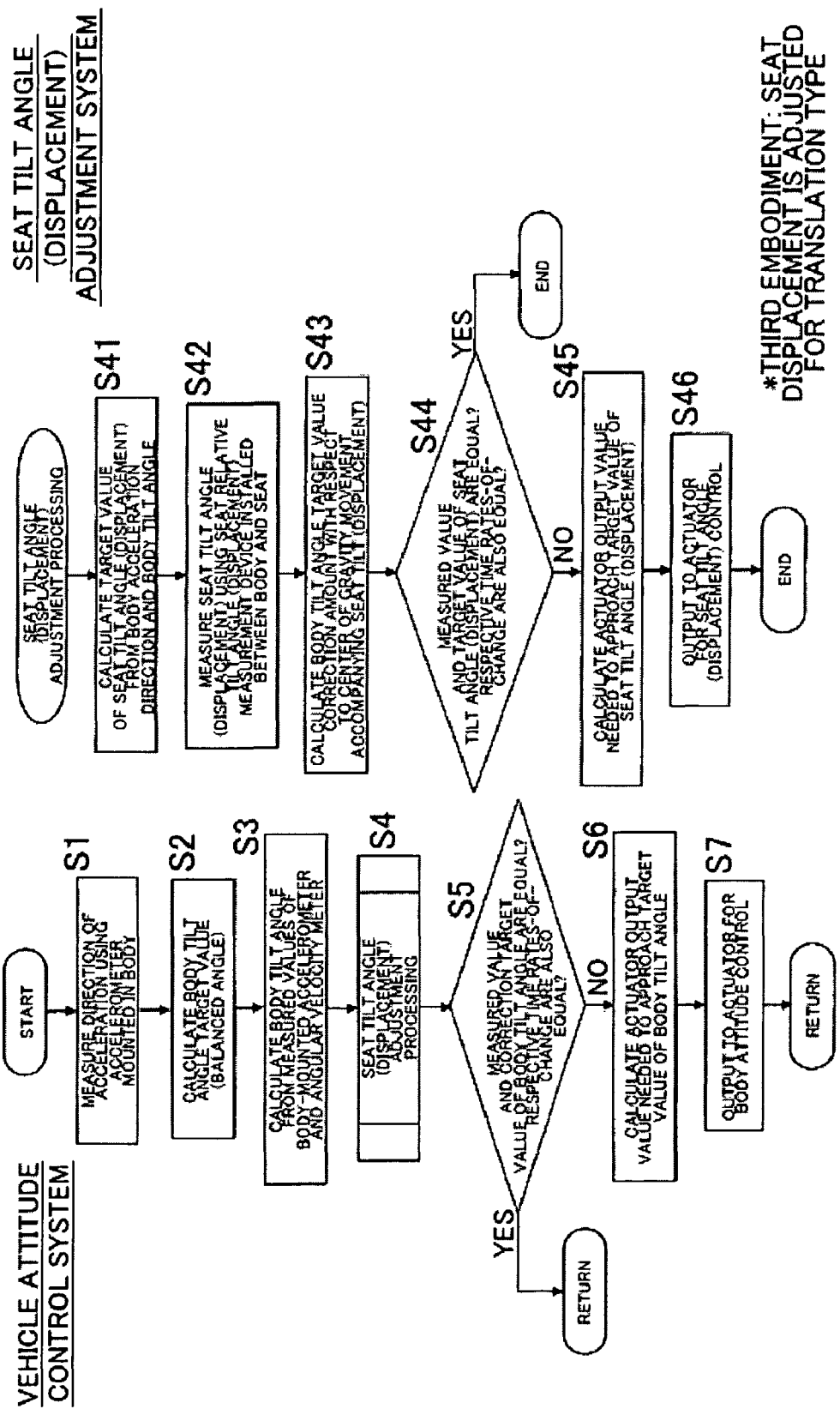
FIG. 8 is a view showing a control flowchart of the second embodiment.

Next, a flowchart of such control means will be described. FIG. 8 is a view showing a control flowchart of the second embodiment. First at step 1, a direction of acceleration is measured by the body-mounted accelerometer 122 (S1). At step 2, a target value (balanced angle) of the body tilt angle is calculated (S2). At step 3, the body tilt angle is calculated from the measured values of the body-mounted accelerometer 122 and the angular velocity meter 121 (S3). At step 4, seat tilt angle adjustment processing to be described later is executed (S4). At step 5, it is determined whether the measured value and the correction target value of the body tilt angle are equal, and whether the respective time rates-of-change are equal (S5). If the determination result is that the measured value and the correction target value of the body tilt angle are equal and the respective time rates-of-change are equal, then the processing returns to the start. If the determination result is that the measured value and the correction target value of the body tilt angle are not equal or that the respective time rates-of-change are not equal, then the processing proceeds to step 6. At step 6, an actuator output value needed for approaching the target value of the body tilt angle is calculated (S6). Lastly, based on the calculated result at step 6, a value is output at step 7 to the actuator for body attitude control (S7).

Here, the seat tilt angle adjustment processing in step 4 will be explained. First at step 41, a target value of the seat tilt angle is calculated from the direction and the body acceleration and the body tilt angle (S41). Next at step 42, the seat tilt angle is measured by the seat relative tilt angle measurement device installed between the body and the seat (S42). At step 43, a correction amount of the body tilt angle target value is calculated with respect to center of gravity movement accompanying the seat tilt (S43). At step 44, it is determined whether the measured value and the target value of the seat tilt angle are equal, and whether the respective time rates-of-change are equal (S44). If the determination result is that the measured value and the target value of the seat tilt angle are equal and the respective time rates-of-change are equal, then the seat tilt angle adjustment processing is ended. If the measured value and the target value of the seat tilt angle are not equal, or the respective time rates-of-change are not equal, then an actuator output value needed for approaching the target value of the seat tilt angle is calculated (S45). Lastly, based on the calculated result at step 45, a value is output at step 46 to the actuator for seat tilt angle control (S46).

Figure 9:
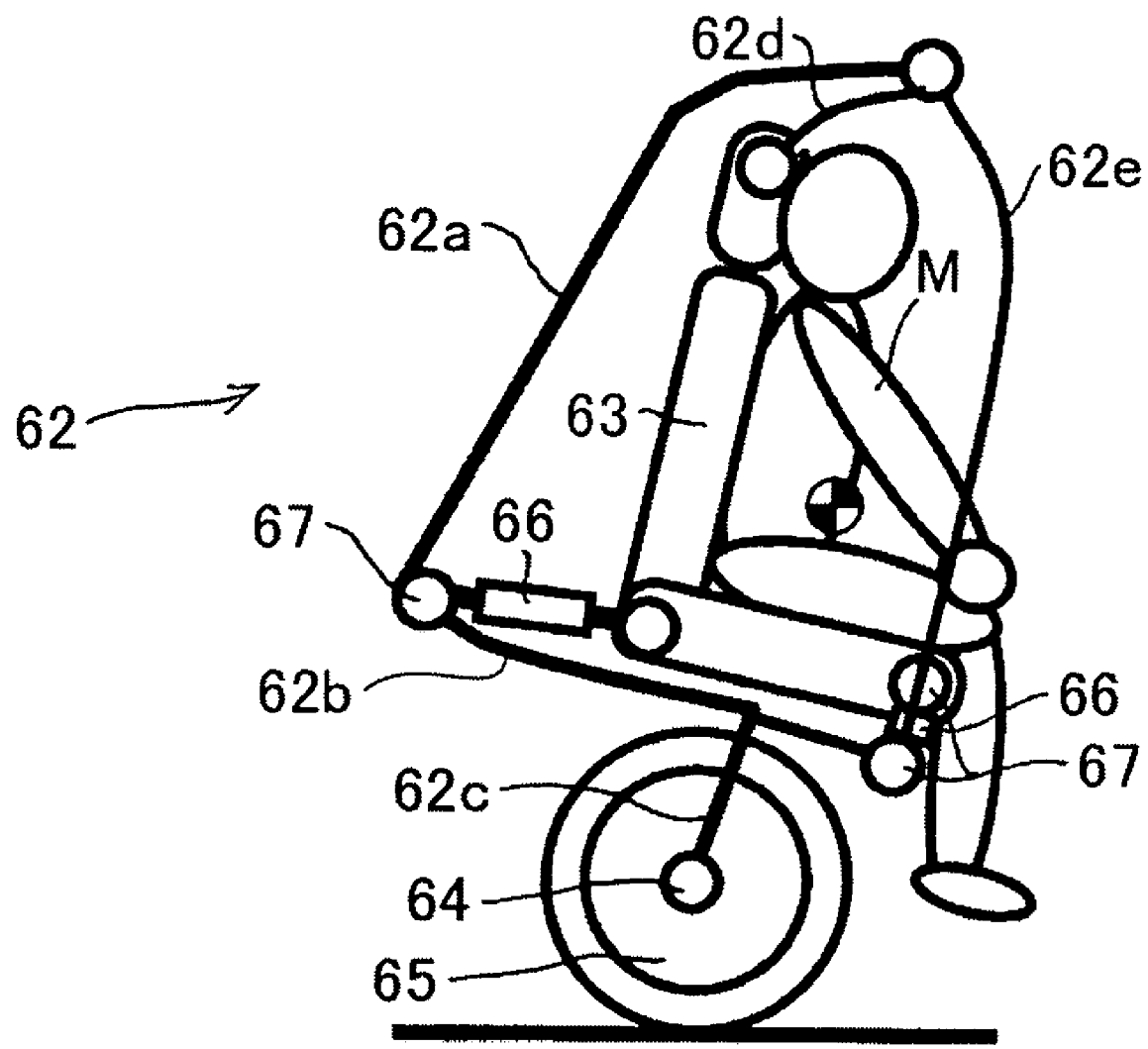
FIG. 9 is a view showing a first example of the second embodiment.

Various examples of the second embodiment described above will be illustrated next. A first example of the second embodiment will be described first. FIGS. 9 and 10 illustrate an example where a rod-shaped actuator is applied to a seat suspended from above. FIG. 9 is a schematic view showing the occupant seated. FIG. 10A is an enlarged view of the occupant riding portion, and FIG. 10B is a plane view of FIG. 10A.

In the figures, reference numeral 1 denotes the motor vehicle, 62 denotes a body, 62a denotes an upper portion, 62b denotes an intermediate portion, 62c denotes a lower portion, 62d denotes a first suspended portion, 62e denotes a second suspended portion, 63 denotes a seat as an example of the occupant riding portion, 64 denotes an axle, 65 denotes a wheel, 66 denotes an actuator, and 67 denotes a joint.

This structure changes the damper 16 of the first example of the first embodiment shown in FIGS. 2 and 3 to the actuator 66. With such a structure, it is possible to control the seat 13 to an arbitrary tilt angle by controlling the actuator 46.

Accordingly, in response to the inertial force or the centrifugal force generated by acceleration, deceleration or a turning motion of the motor vehicle, the occupant riding portion can be moved so as to balance the inertial force or the centrifugal force. Therefore, the occupant feels the same force while balanced as when stationary, making it possible to reduce the load on the occupant during accelerating, decelerating, and turning. Furthermore, no energy is required in order to hold an upright attitude while stopped or traveling at a constant speed.

Figure 11:
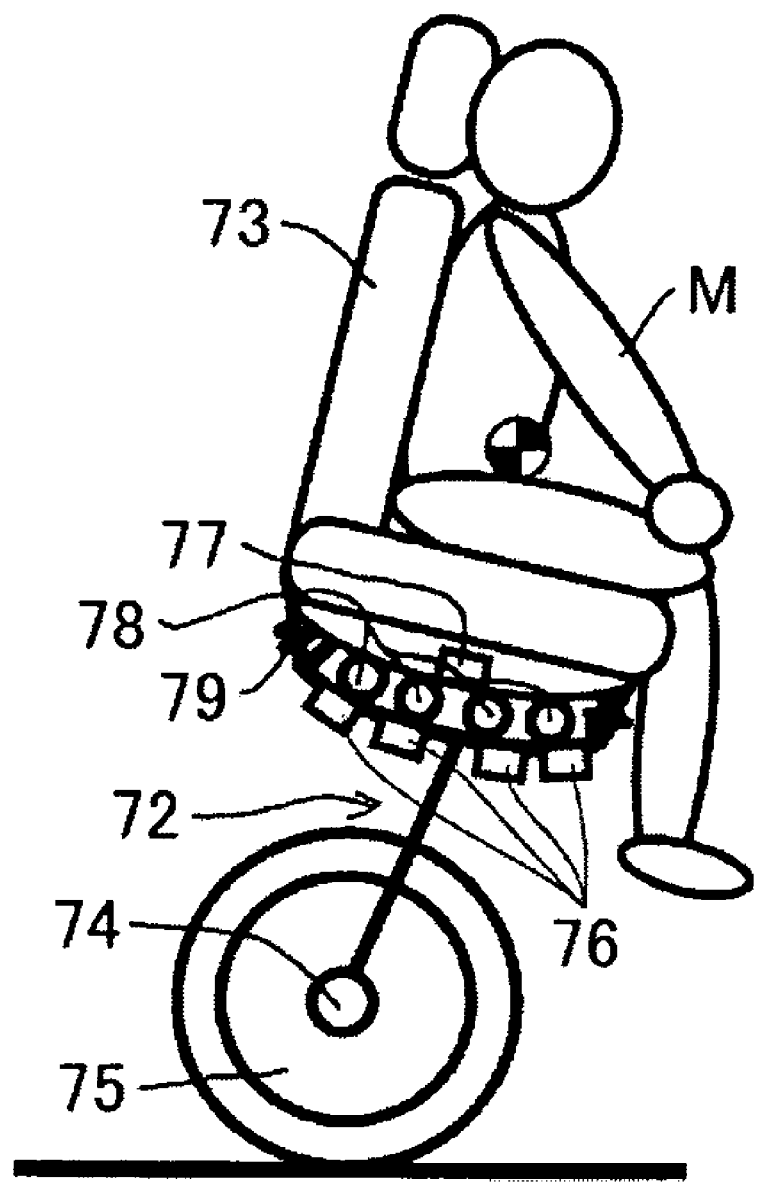
FIG. 11 is a view showing a second example of the second embodiment.
Figure 12:
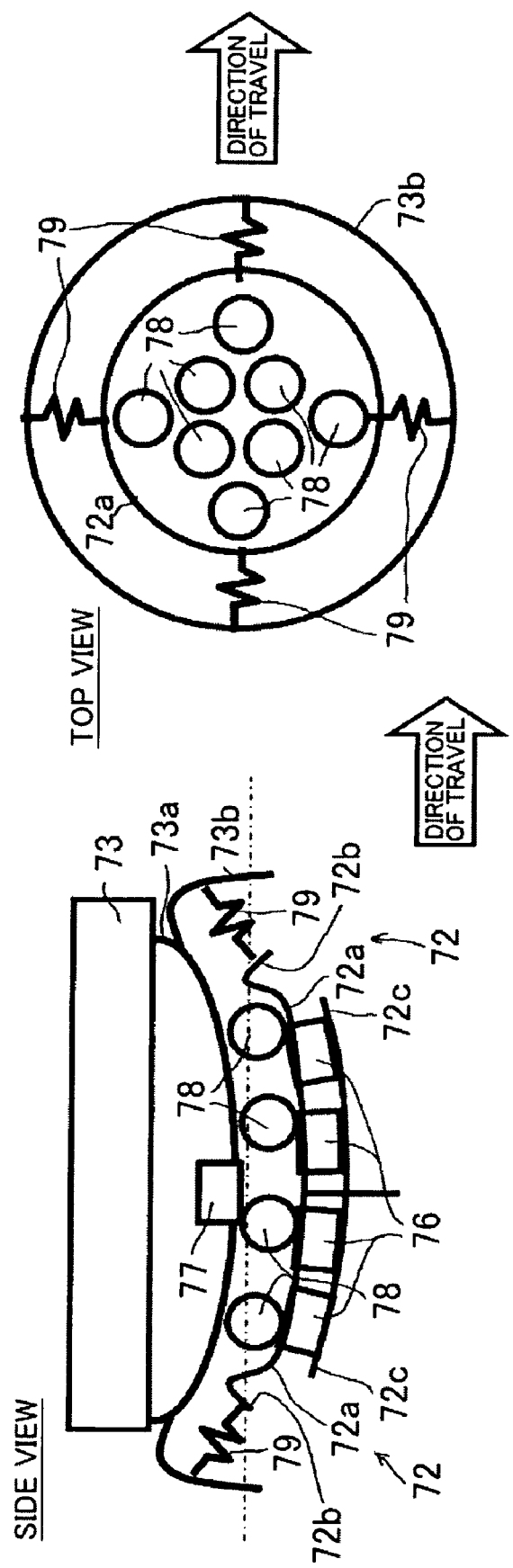
FIG. 12 shows views of the second example of the second embodiment.

A second example of the second embodiment will be described next. FIGS. 11 and 12 illustrate an example that employs an electromagnetic force. FIG. 11 is a schematic view showing the occupant seated. FIG. 12A is an enlarged view of a seat driving portion, and FIG. 12B is a plane view of FIG. 12A.

In the figures, reference numeral 1 denotes the motor vehicle, 72 denotes a body, 72a denotes an upper end surface, 72b denotes a stopper portion, 72c denotes a coil attachment portion, 73 denotes a seat as an example of the occupant riding portion, 73a denotes a bottom surface, 73b denotes a spring attachment portion, 74 denotes an axle, 75 denotes a wheel, 76 denotes a coil, 77 denotes a permanent magnet, 78 denotes a ball, and 79 denotes a spring.

The body 72 includes the upper end surface 72a, which is shaped as a spherical surface, on an upper portion thereof, and also includes the stopper portion 72b that is on an edge of the upper end surface, as well as the coil attachment portion 72c that is provided with a plurality of the coils 76 below the upper end surface 72a. In addition, the body 72 is connected with the seat 73 by the spring 79. The seat 73 includes the bottom surface 73a, which is shaped as a spherical surface, and the permanent magnet 77 is disposed on the bottom surface 73a facing the coil 76, which is attached to the coil attachment portion 72a of the body 72. The non-magnetic balls 78 are disposed between the upper end surface 72a of the body 72 and the bottom surface 73a of the seat 73. The upper end surface 72a of the body 72 is provided with the stopper portion 72b, and the spring 79 is provided in a radial direction between the stopper portion 72b and the spring attachment portion 73b of the seat 73.

With such a structure, controlling a current distribution of the coil 76 attached to the coil attachment portion 72c of the body 72 enables control of the seat 73 to an arbitrary tilt angle. Furthermore, the upper end surface 72a of the body 72 is provided with the stopper portion 72b, which ensures that the balls 78 do not escape from a space between the upper end surface 72a of the body 72 and the bottom surface 73a of the seat 73. Also, the springs 79 are disposed in the radial direction between the stopper portion 72b and the spring attachment portion 73b of the seat 73, thereby connecting the body 72 and the seat 73. The non-magnetic balls 78 are disposed between the upper end surface 72a of the body 72 and the bottom surface 73a of the seat 73, and can reduce the friction between the two surfaces. Furthermore, no energy is required in order to hold an upright attitude while stopped or traveling at a constant speed.

Accordingly, in response to the inertial force or the centrifugal force generated by acceleration, deceleration or a turning motion of the motor vehicle, the occupant riding portion can be moved so as to balance the inertial force or the centrifugal force. Therefore, the occupant feels the same force while balanced as when stationary, making it possible to reduce the load on the occupant during accelerating, decelerating, and turning.

Figure 13:
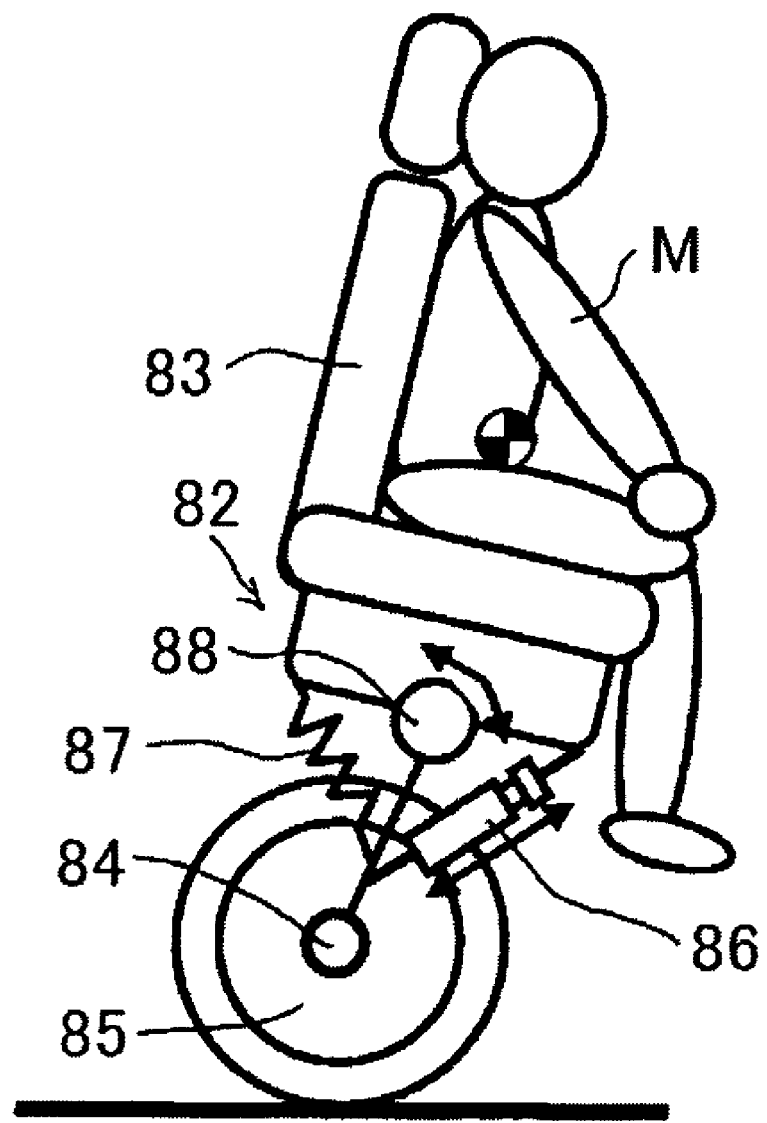
FIG. 13 is a view showing a third example of the second embodiment.
Figure 14:
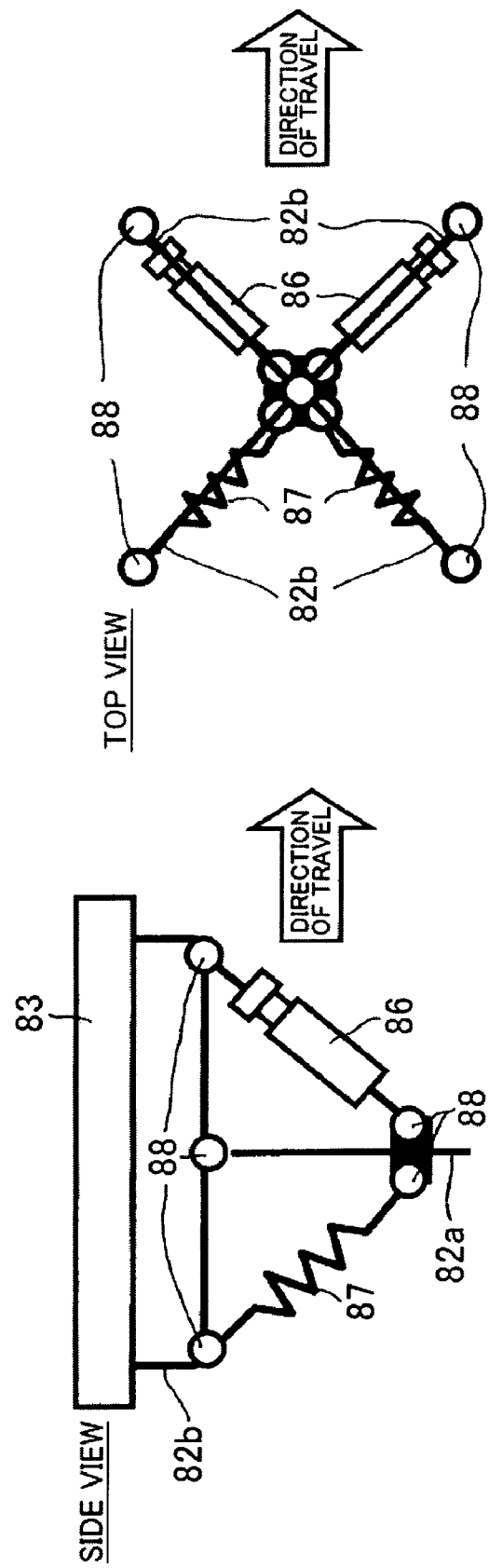
FIG. 14 shows views of the third example of the second embodiment.

A third example will be described next. FIGS. 13 and 14 illustrate an example that employs a rod-shaped actuator. FIG. 13 is a schematic view showing the occupant seated. FIG. 14A is an enlarged view of a seat driving portion, and FIG. 14B is a plane view of FIG. 14A.

In the figures, reference numeral 1 denotes the motor vehicle, 82 denotes a body, 82a denotes a main frame, 82b denotes a seat attachment frame, 83 denotes a seat as an example of the occupant riding portion, 84 denotes an axle, 85 denotes a wheel, 86 denotes an actuator, 87 denotes a spring, and 88 denotes a joint.

The body 82 is formed from the main frame 82a and the seat attachment frame 82b. The seat attachment frame 82b is diagonally disposed on a lower portion of the seat 83. The main frame 82a connects the axle 84 with an intersection point of diagonal lines of the seat attachment frame 82b via the joint 88, which is a universal joint or the like. The actuator 86 uses a ball screw, an electromagnetic actuator or the like, and connects a generally intermediate portion of the main frame 82a with a travel-direction side end of the seat attachment frame 82b via the joint 88. The spring 87 connects the generally intermediate portion of the main frame 82a with the travel-direction side end of the seat attachment frame 82b via the joint 88.

With such a structure, shortening and lengthening of the actuator 86 enables control of the seat 83 to an arbitrary tilt angle. By providing the spring 87, it is also possible to prevent falling backward if the actuator 86 fails, and eliminates the need for energy in order to hold an upright attitude while stopped or traveling at a constant speed.

Accordingly, in response to the inertial force or the centrifugal force generated by acceleration, deceleration or a turning motion of the motor vehicle, the occupant riding portion can be moved so as to balance the inertial force or the centrifugal force. Therefore, the occupant feels the same force while balanced as when stationary, making it possible to reduce the load on the occupant during accelerating, decelerating, and turning.

A fourth example will be described next. FIGS. 15 and 16 illustrate an example that employs a slide actuator. FIG. 15 is a schematic view showing the occupant seated. FIG. 16A is an enlarged view of a seat driving portion, and FIG. 16B is a plane view of FIG. 16A.

In the figures, reference numeral 1 denotes the motor vehicle, 92 denotes a body, 92a denotes an upper end portion, 92b denotes an intermediate portion, 92c denotes a lower portion, 92d denotes a rail, 93 denotes a seat as an example of the occupant riding portion, 94 denotes an axle, 95 denotes a wheel, 96 denotes an actuator, 96a denotes a rod-shaped portion, 96b denotes a base portion, 97 denotes a movable body, 98 denotes a spring, and 99 denotes a joint.

The body 92 includes the square-shaped upper end portion 92a, the lower portion 92c connected with the axle 94, and the intermediate portion 92b that connects the lower portion 92c with the four corners of the upper end portion 92a. The rails 92d are provided on respective side upper surfaces of the upper end portion 92a. Movable bodies 97 are mounted on the rails 92d, and the movable bodies 97 are joined with the actuator 96. The actuator 96 is a type that employs a ball screw or electromagnetism, and includes two rod-shaped portions 96a and the base portion 96b. The two rod-shaped portions 96a are disposed at right angles to each other and joined with the movable bodies 97 on two opposing sides. The base portion 96b is connected with the respective rod-shaped portions 96a so as to allow relative displacement. The spring 98 is provided between the base portion 96b of the actuator 96 and the intersection point among the intermediate portion 92b and the lower portion 92c of the body 92 via the joint 99, which is a ball joint, universal joint, or the like. In addition, the spring 98 is biased such that the base portion 96b of the actuator 96 in arranged on a line that extends from the lower portion 92c of the body 92.

With such a structure, controlling the actuator 96 enables control of the seat 93 so as to be movable to an arbitrary position within the upper end portion 92a of the body 92. By attaching the spring 98, it is also possible to aid the holding of an attitude if the actuator 96 fails, and eliminates the need for energy in order to hold an upright attitude while stopped or traveling at a constant speed.

Accordingly, in response to the inertial force or the centrifugal force generated by acceleration, deceleration or a turning motion of the motor vehicle, the occupant riding portion can be moved so as to balance the inertial force or the centrifugal force. Therefore, the occupant feels the same force while balanced as when stationary, making it possible to reduce the load on the occupant during accelerating, decelerating, and turning.

INDUSTRIAL APPLICABILITY

As described above, the motor vehicle according to the present invention includes: body attitude detection means for detecting an attitude of the body; and body attitude control means for controlling the body attitude detected by the body attitude detection means, wherein, in response to an inertial force or a centrifugal force generated by acceleration, deceleration or a turning motion of the motor vehicle, an occupant riding portion is moved so as to balance the inertial force or the centrifugal force. Accordingly, an occupant feels the same force while balanced as when stationary, making it possible to reduce the load on the occupant during accelerating, decelerating, and turning. The motor vehicle further includes occupant attitude control means for controlling an attitude of the occupant riding portion in accordance with a detection value detected by the body attitude detection means. Accordingly, the acceleration experienced by the occupant can be arbitrarily set when the acceleration of the motor vehicle changes. The occupant can thus be moved smoothly while also allowing the attitude of the occupant to be freely set. The occupant attitude control means can also be connected with existing body attitude control means, which offers an advantage in terms of cost.

The invention claimed is:

1. A motor vehicle comprising:
   a body;
   a wheel rotatably supported on the body;
   an occupant riding portion supported by the body for tilting relative to the body and mounted with an occupant;
   occupant attitude detection means for detecting an attitude of the occupant riding portion;
   body attitude detection means for detecting an attitude of the body;
   body attitude control means for controlling the body attitude based on the attitude of the body detected by the body attitude detection means; and
   occupant attitude control means that controls an attitude of the occupant riding portion in accordance with the attitude of the body detected by the body attitude detection means and with the attitude of the occupant riding portion detected by the occupant attitude detection means.

2. The motor vehicle according to claim 1, wherein the body attitude detection means includes acceleration detection means for detecting an acceleration and a deceleration of the body, and the occupant attitude control means controls the attitude of the occupant riding portion in accordance with the acceleration and the deceleration detected by the acceleration detection means.

3. The motor vehicle according to claim 2 wherein the wheel is rotatably mounted on an axle which supports the body and on which the body pivots.

4. The motor vehicle according to claim 3 wherein the occupant attitude detection means detects a seat angle relative to the body.

5. The motor vehicle according to claim 3 wherein the occupant attitude detection means is a biaxial seat relative tilt angle measurement device which detects a seat angle relative to the body.

6. The motor vehicle according to claim 2 having only two wheels, the two wheels being located at opposing ends an axle which is supported on the body and which defines an axis on which the body pivots in change of attitude.

7. The motor vehicle according to claim 1 wherein the wheel is rotatably mounted on an axle which supports the body and on which the body pivots.

8. The motor vehicle according to claim 7 wherein the occupant attitude detection means detects a seat angle relative to the body.

9. The motor vehicle according to claim 7 wherein the occupant attitude detection means is a biaxial seat relative tilt angle measurement device which detects a seat angle relative to the body.

10. The motor vehicle according to claim 1 wherein the occupant attitude detection means detects a seat angle relative to the body.

11. The motor vehicle according to claim 1 wherein the occupant attitude detection means is a biaxial seat relative tilt angle measurement device which detects a seat angle relative to the body.

12. The motor vehicle according to claim 1 having only two wheels, the two wheels being located at opposing ends an axle which is supported on the body and which defines an axis on which the body pivots in change of attitude.

\* \* \* \* \*